(12) United States Patent
Mane et al.

(10) Patent No.: US 7,242,758 B2
(45) Date of Patent: Jul. 10, 2007

(54) SYSTEM AND METHOD FOR AUTOMATICALLY PROCESSING A USER'S REQUEST BY AN AUTOMATED ASSISTANT

(75) Inventors: Amir Mane, Lincroft, NJ (US); Esther Levin, Livingston, NJ (US); Susan Boyce, Rumson, NJ (US)

(73) Assignee: Nuance Communications, Inc, Burlington, MA (US)

( * ) Notice: Subject to any disclaimer, the term of this patent is extended or adjusted under 35 U.S.C. 154(b) by 947 days.

(21) Appl. No.: 10/353,012

(22) Filed: Jan. 29, 2003

(65) Prior Publication Data

US 2004/0024754 A1 Feb. 5, 2004

Related U.S. Application Data

(60) Provisional application No. 60/365,167, filed on Mar. 19, 2002.

(51) Int. Cl.
*H04M 3/493* (2006.01)
*H04M 1/64* (2006.01)
*G06F 17/30* (2006.01)

(52) U.S. Cl. ............................. 379/218.01; 379/88.04; 707/3

(58) Field of Classification Search ............. 379/88.04, 379/88.18, 218.01; 707/1–6
See application file for complete search history.

(56) References Cited

U.S. PATENT DOCUMENTS

| 5,457,738 | A | 10/1995 | Sylvan | 379/96 |
|---|---|---|---|---|
| 5,850,433 | A | 12/1998 | Rondeau | 379/201 |
| 6,173,279 | B1* | 1/2001 | Levin et al. | 707/5 |
| 6,189,003 | B1* | 2/2001 | Leal | 707/2 |
| 6,330,308 | B1 | 12/2001 | Cheston, III et al. | 379/88.04 |
| 6,438,539 | B1* | 8/2002 | Korolev et al. | 707/3 |
| 6,795,543 | B1* | 9/2004 | Cartier et al. | 379/219 |
| 6,907,119 | B2* | 6/2005 | Case et al. | 379/218.01 |
| 2001/0006890 | A1 | 7/2001 | Ryu | |

FOREIGN PATENT DOCUMENTS

WO   WO 96/13030 A2   5/1996

\* cited by examiner

*Primary Examiner*—Harry S. Hong
(74) *Attorney, Agent, or Firm*—Kenyon & Kenyon LLP

(57) ABSTRACT

Embodiments of the present invention relate to a method and system for providing automated directory assistance with minimum external or operator intervention. A directory listing request may be received from a user. The directory listing request may be recognized and a first search of a database may be conducted for the recognized directory listing request. If more than one match for the recognized directory listing request is found in the database, the user may be prompted to provide at least one of a street address and category information for the recognized directory listing request. A second search of the database may be conducted using at least one of the street address and the category information provided by the user. If a match for the recognized directory listing request is found, a directory listing may be output to the user.

37 Claims, 3 Drawing Sheets

SYSTEM AND METHOD FOR AUTOMATICALLY PROCESSING A USER'S REQUEST BY AN AUTOMATED ASSISTANT

CROSS-REFERENCE TO RELATED PATENT APPLICATION

This patent application claims the benefit of U.S. Provisional Patent Application Ser. No. 60/365,167, filed Mar. 19, 2002, which is incorporated herein by reference in its entirety.

TECHNICAL FIELD

The present invention relates to automatic directory assistance. In particular, the present invention relates to systems and methods for eliciting further refinement of a user's request for information to an automated directory assistant.

BACKGROUND OF THE INVENTION

In recent years, automated attendants have become very popular. Many individuals or organizations use automated attendants to automatically provide information to callers and/or to route incoming calls. An example of an automated attendant is an automated directory assistant that automatically provides a telephone number, address, etc. for a business or an individual in response to a user's request.

Typically, a user places a call and reaches an automated directory assistant (e.g. an Interactive Voice Recognition (IVR) system) that prompts the user for desired information and searches an informational database (e.g., a white pages listings database) for the requested information. The user enters the request, for example, a name of a business or individual via a keyboard, keypad or spoken inputs. The automated attendant searches for a match in the informational database based on the user's input and may output a voice synthesized result if a match can be found.

If an exact match is not found and/or if multiple entries are identified as possible matches, operator intervention is generally required for completion of the user's request for information. This process can be time consuming and a user may become frustrated if he or she is not able to readily obtain the desired information such as a telephone number of a business and/or individual. Additionally, if the user has a partial or erroneous name of the business, then the user may not be able to quickly find the desired information or may not find the requested information at all. This scenario may result in either wasted time and/or a lost business opportunity for the both the user and the intended business.

SUMMARY OF THE INVENTION

Embodiments of the present invention concern a method and system for providing automated directory assistance with minimum external or operator intervention. A directory listing request may be received from a user. The directory listing request may be recognized and a first search of a database may be conducted for the recognized directory listing request. If more than one match for the recognized directory listing request is found in the database, the user may be prompted to provide at least one of a street address and category information for the recognized directory listing request. A second search of the database may be conducted using at least one of the street address and the category information provided by the user. If a match for the recognized directory listing request is found, a directory listing may be output to the user.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Embodiments of the present invention relate to a method and apparatus for automatically recognizing and/or processing a user's communication. Embodiments of the present invention may minimize operator intervention and permit a caller to quickly process her request and/or receive the desired information from an automated attendant.

Embodiments of the present invention may utilize progressively grounded dialogues permitting the system to automatically prompt the caller for information and based on the received information from the caller, the caller's request for information may be completed. In some cases, additional information may be solicited from the caller and the additional information may be used to refine the search for the information requested by the caller. Accordingly, embodiments of the present invention may provide a more efficient and effective system for automatically processing the user's request with minimal external intervention.

Figure 1:
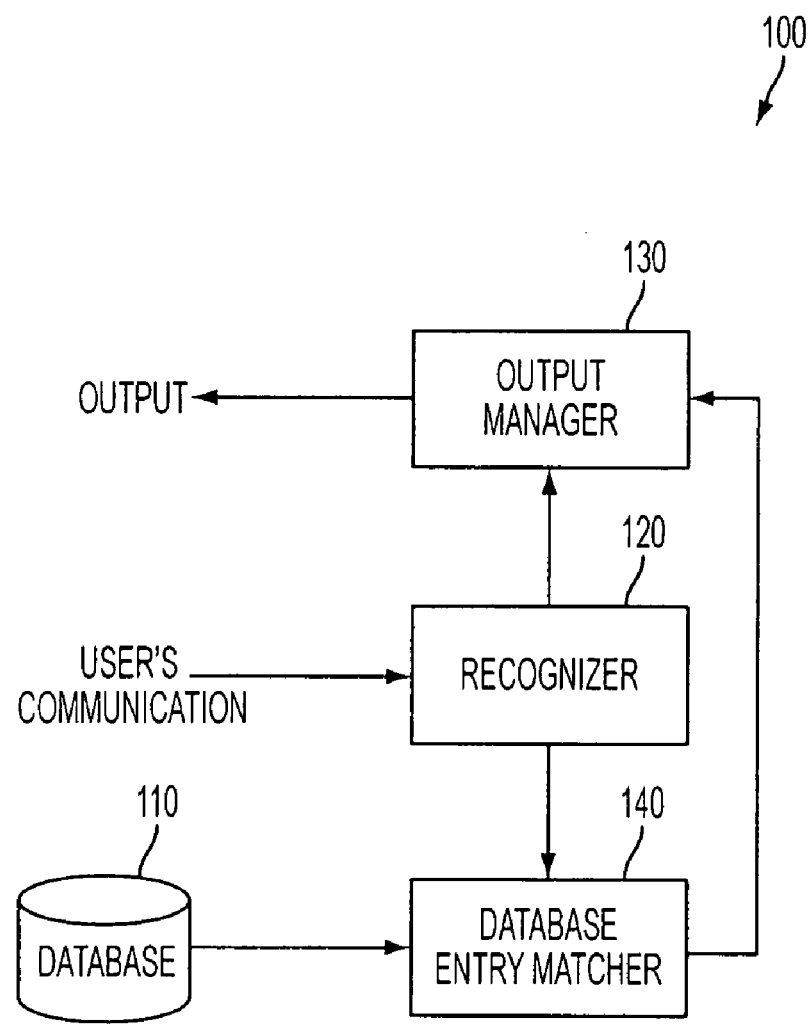
FIG. 1 is a block diagram of an automated attendant in accordance with an embodiment of the present invention.

FIG. 1 is an exemplary block diagram of an automated assistance/communication system 100 for processing a user's communication in accordance with an embodiment of the present invention. A recognizer 120 is coupled to a dialogue manager or output manager 130 and a database entry matcher 140. The database entry matcher 140 is further coupled to database 110.

While the examples discussed in the embodiments of the patent concern recognition of speech, the recognizer 120 may also receive a user's communication or inputs in the form of speech, text, digital signals, analog signals and/or any other forms of communications or communications signals. As used herein, user's communication can be a user's input in any form that represents, for example, a single word, multiple words, a single syllable, multiple syllables, a single phoneme and/or multiple phonemes. The user's communication may include a request for information, products, services and/or any other suitable requests.

A user's communication may be input via a communication device such as a wired or wireless phone, a pager, a personal digital assistant, a personal computer, and/or any other device capable of sending and/or receiving communications. The user's communication is received at the recognizer 120. In embodiments of the present invention, the user's communication could be a search request to search the World Wide Web (WWW), a Local Area Network (LAN), and/or any other private or public network for the desired information.

In embodiments of the present invention, the recognizer 120 may be any type of recognizer known to those skilled in the art. In one embodiment, the recognizer may be an automated speech recognizer (ASR) such as the type developed by Nuance Communications. The automated assistance system 100, where the recognizer 120 is an ASR, may operate similar to an IVR and may include the database entry matcher 140 in accordance with embodiments of the present invention. In embodiments of the present invention, the recognizer 120 may use any known recognition techniques to recognize a user's communication so that the database entry matcher 140 can use the recognized communication to find a N-best match in the database 110.

In embodiments of the present invention, the recognizer 120 can be a text recognizer, optical character recognizer and/or another type of recognizer or device that recognizes and/or processes a user's inputs, and/or a device that receives a user's input, for example, a keyboard or a keypad. In embodiments of the present invention, the recognizer 120 may be incorporated within a personal computer, a telephone switch or telephone interface, and/or an Internet, Intranet and/or other type of server.

In embodiments of the present invention, the recognizer 120 may include and/or may operate in conjunction with, for example, an Internet search engine that receives text, speech, etc. from an Internet user. In this case, the recognizer 120 may receive user's communication via an Internet connection and operate in accordance with embodiments of the invention as described herein.

The database 110 may include a listings database that has stored symbol strings or information entries that represent information relating to a particular subject matter. For example, the listings database may include residential, governmental, and/or business listings for a particular town, city, state, and/or country. It is recognized that the stored symbol strings could represent or include a myriad of other types of information such as individual directory information, specific business or vendor information, postal addresses, e-mail addresses, product and/or service information, etc. In embodiments of the present invention, the database 110 can be part of larger database of listings information such as a database or other information resource that may be searched by, for example, any Internet search engine when performing a user's search request.

The term directory listing as used herein may refer to a telephone number, pager number, postal address, e-mail address, web page address, and/or any other information for an individual, business etc. It is recognized that the automated assistance system 100 in accordance with embodiments of the present invention can be used in a variety of applications. For example, the automated assistance system as described herein may be used to order products and/or services so that the need for operator intervention can be kept to a minimum and the user's request can be processed efficiently.

It is recognized that any suitable hardware, software and/or any combination thereof may be used by one of ordinary skill in the art to configure and/or implement the automated assistance system 100 including the database entry manager 140, recognizer 120 and output manager 130 in accordance with embodiments of the present invention.

In embodiments of the present invention, the dialogue or output manager 130 may include a speech synthesizer that may conduct an interactive dialogue with a user to complete the user's request. For example, the dialogue manager 130 may receive inputs from recognizer 120 and/or data entry matcher 140, and may output results, requests for additional information, etc. to the user in the form of synthesized speech. It is recognized that the output manager may include a display to output the results, requests for additional information, etc. The output manager may be any other device or combination thereof to output information to the user and/or conduct an interactive session with the user.

In an exemplary embodiment of the present invention, the recognizer 120 receives the user's communication and generates one or more symbol strings, which represent the user's communication, using known methods. The symbol strings may be text or character strings that represent a request for individual or business listings and/or other information for which the user desires additional information. In one example, the recognized symbol string may be the name of a business for which the user desires a telephone number. In another example, the recognized symbol strings may be the name of a product and/or service that the caller wants to order. It is recognized that the recognizer 120 may use known techniques to generate the one or more symbol strings that represent the user's communication.

Figure 2:
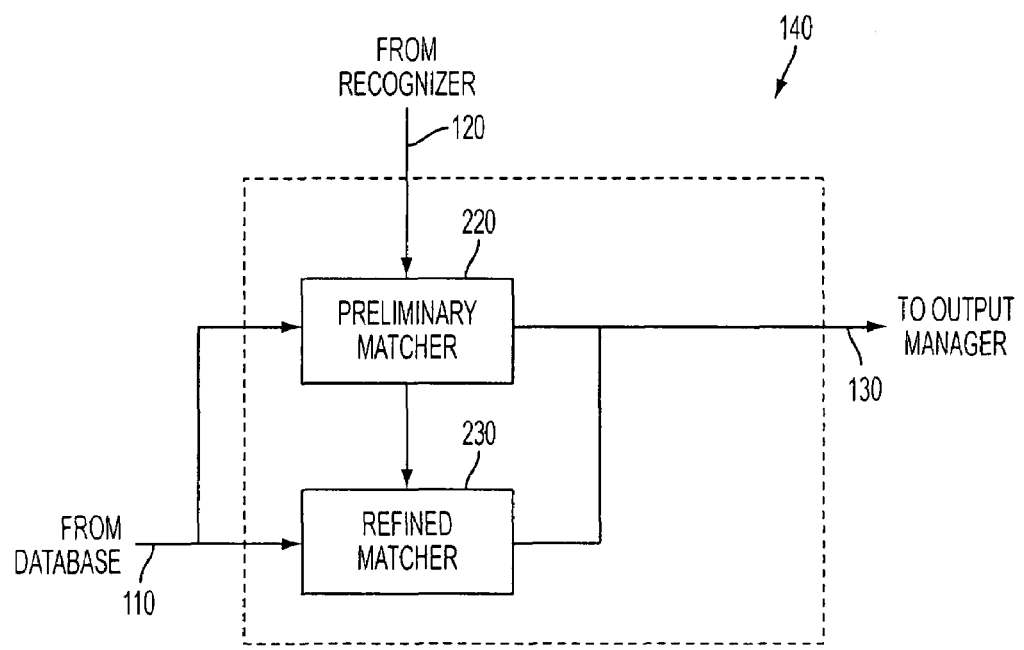
FIG. 2 illustrates a block diagram of a database entry matcher in accordance with an embodiment of the present invention.

In an embodiment of the present invention, the recognized one or more symbol strings generated by recognizer 120 are sent to the database entry matcher 140. In this example, the database entry matcher 140 receives the recognized symbol strings and searches entries of database 110 for a match using a preliminary matcher 220, as shown in FIG. 2. If a match is found that meets or exceeds a corresponding confidence level and/or predetermined threshold, the preliminary matcher 220 may retrieve the requested information associated to the matched entry from database 110 and sends the requested information to the output manager 130. The output manager 130 sends the matched entry and associated information to the user. It is recognized that the preliminary matcher 220 may send the matched entry to the user for confirmation. In this case, the information associated with the matched entry may be sent to the user after confirmation.

In embodiments of the present invention, if the preliminary matcher 220 finds more than one match for the user's request in the database 110 or if the matched entry does not meet the threshold requirements, the automated assistance system 100 may automatically request the user for additional information, attributes or parameters that may be used to narrow the user's request. These additional information, attributes, parameters, etc. may be related to and/or may further identify the requested information. The preliminary matcher 220 may generate a short list including all of the entries that preliminarily match the user's request. In this case, the preliminary matcher 220 may inform the output manager 130 that additional information related to the user's request is needed to complete the user's request.

The output manager 130 may be configured to automatically engage in a dialogue with the user to request the additional information related to the user's request. The additional information from the user may be received by the recognizer 120 and forwarded to the database entry matcher 140. The database entry matcher 140 may use the additional information to narrow the search for the requested information.

In one example, if the user requires a telephone number for a business, the additional information may be a street address for the business. Optionally and/or additionally, the additional information may be a category to which the business may belong. The categories may include names of, for example, restaurants, grocery stores, sporting goods stores, jewelry stores, book stores, clothing stores, theaters, departments, etc.

In embodiments of the present invention, the categories may be broader such as residential or commercial information. The categories may also be narrower so as to specifically identify or narrow the requested listing so that an accurate match can be found efficiently. Narrower categories or information relate to the requested information may include, for example, a name of a department of a store or hospital, street name where the listing is located, middle name of the individual, and/or any other information that defines a discriminating attribute related to the requested information or listing.

It is recognized that any number of different categories or information may be created and used to categorize information stored in database 110. The variety of categories may be used not only to organize the information in database 110 but also to search for information requested by a user. It is recognized that the additional information can be any information, attributes and/or parameters related to the information that may help to specifically identify the requested information. In another example, if the user of the system 100 is ordering a book, the additional information may be the name of the author and/or the publisher.

The preliminary matcher 220 may forward the additional information and the created short list including all of the entries that potentially match the user's request to a refined matcher 230. The refined matcher applies the additional information received from the user to select the entry for which the user may request additional information.

In one example, a user may contact an automated assistance system 100 to get a desired listing that may be a phone number for a particular business in Morristown, N.J. The user may provide a listing request to the automated assistance system 100. The listing request may be, for example, the name of the business or individual for which the user requires further information such as telephone number, e-mail address, postal address, etc. Once the user contacts automated assistance system 100, a voice synthesizer (not shown) included in the output manager 130 may prompt the user to provide the city and state for the requested listing. The user may respond with, for example, "Morristown, N.J." The voice synthesizer may then prompt the user for the listing request. The user may respond with "Aquaviva."

The recognizer 120 digitizes the listing request and recognizes the digitized signals using, for example, phoneme and/or word recognition devices (not shown) in the recognizer 120. In embodiments of the present invention, the recognizer 120 may determine a confidence level for the digitized signals representing the recognized request. If the determined confidence level meets or exceeds a predetermined threshold, the recognizer 120 may forward the recognized request to the database entry matcher 140 for processing.

In embodiments of the present invention, if the determined confidence level is below the predetermined threshold, the output manager 130 of system 100 may be invoked to prompt the user to repeat the request. In this case, the repeated request may again be forwarded to the recognizer 120 and the recognizer may attempt to recognize the request in accordance with embodiments of the present invention. Once the request is recognized, the digitized signals representing the recognized request are forwarded to the database entry matcher 140 for further processing in accordance with embodiments of the present invention.

In embodiments of the invention, once the database entry matcher 140 receives the recognized request from the recognizer 120, the preliminary matcher 220 may search the database 110 to find a match for the requested listing. In this example, the database 110 may be white pages database that contains, for example, names, addresses, telephone numbers, etc. for businesses in a particular area.

It is recognized that entries in the database 110 may belong to a single category or may belong to or have one or more corresponding categories. For example, an entry for "Tony's Pizza" may have corresponding one or more categories such as "restaurant," "pizza parlor," "carry out," "fast food" or any other information that classifies the entry. In embodiments of the present invention, the category information may be used to store the entries in database 110. For example, all restaurants may be categorized together and/or all the grocery stores may be categorized together. The category information may be used to quickly find a match for the listing requested by the user, to be described below in more detail. It is recognized, that entries in the database 110 may have other discriminating attributes or information that may be used to store and/or search for the entry in accordance with embodiments of the present invention.

In embodiments of the present invention, if the preliminary matcher 220 finds a match for the listing request in database 110 that meets or exceeds a predetermined threshold established by the database entry matcher 140, the directory listing associated with the matched listing request may be retrieved from database 110. The retrieved directory listing may be forwarded to the output manager 130 and presented to the user.

In embodiments of the present invention, if the preliminary matcher 220 does not find a match in database 110 that meets or exceeds a predetermined threshold, and/or if multiple entries that potentially match the listing request are found, a short list including entries that potentially match the listing request may be created by the preliminary matcher 220. For example, the preliminary matcher 220 may generate the following short list that includes a plurality of entries potentially matching the listing request. The short list may be, for example:

| Potential Listing Name | Potential Listing Address | Potential Listing Category |
|---|---|---|
| Aqua Viva | 1234 Blossom Road | Restaurant |
| Aqua Sports | Route 24 | Sporting Goods Store |
| Aquamarine | 5678 Main Street | Jewelry Store |

In embodiments of the present invention, The database entry matcher 140 may automatically notify the output manager 130 that more than one listing matching the listing request has been found in the database 110. In addition, the short list created by the preliminary matcher 220 may be forwarded to the refined matcher 230. The output manager 130 may initiate a dialogue with the user to elicit additional information relating to the user's request. This additional information from the user may be used to identify the requested listing from the plurality of entries included in the short list. For example, the output manager 130 may prompt the user to provide the street name for the desired listing using the voice synthesizer.

In embodiments of the present invention, the system may employ any number or type of intermediate steps or interactive exchanges with the user to confirm and/or solicit information related to the user's request. For example, the system may employ an intermediate step to confirm and/or solicit a response related to a common element related to the request. In other words, after receiving the request and/or performing the search, the output manager 130 may state "That's Tony's Pizza, right?" and in response the user may input an affirmative or negative response. If the response is in the negative, the system may request the user for the request again and/or it may perform another search. If the user's response is in the affirmative, the output manager may state, for example, "I have two listings, the first on Broad Street, and the second on Oak Street. Which one would you like?" After the user makes a selection, the output manager 130 may output the requested information. It is recognized that that the above exchange or intermediate step is given by example only and that any number of intermediate steps may be employed to process the user's request in accordance with embodiments of the present invention.

Optionally or additionally, the output manager 130 may request the user to provide a listing category for the desired listing. It is recognized that the additional information may include, for example, an e-mail address, a web page address, zip code, area code, and/or any other information that can be used to more specifically identify the listing request. The user may provide the additional information to the recognizer 120. The recognizer 120 may recognize the additional information as described above and the recognized information may be forwarded to the refined matcher 230.

In embodiments of the present information, the refined matcher 230 may conduct another search of database 110 to find a match for the listing request using the additional information received from the user.

In embodiments of the present invention, the refined matcher 230 may use the additional information received from the user to identify a match for the user's request from the generated short list. For example, if the user indicates that the street name for he listing request is "Route 24" and/or the listing category is "Sporting Goods Store," the refined matcher 230 may determine that the listing requested is "Aqua Sports." Once a match for the listing request is determined, the directory listing associated with the matched listing request may be retrieved from database 110. The retrieved directory listing may be forwarded to the output manager 130 and presented to the user. As indicated above, directory listing may be a telephone number, a postal address, an e-mail address, a web page address, etc.

It is recognized that the short list shown above is given by way of example only and that additional listings as well as additional information such as the city, state, country, e-mail address, web page address, telephone number, etc. corresponding to the listings may be included in the short list and used to identify a particular listing if more than one possible match for the listing request is found. Additionally it is recognized that the above dialogue initiated by the output manager 130 is given by way of example only and that other types of dialogues may be initiated by the output manager 130 to elicit the appropriate information from the user.

In alternative embodiments of the present invention, if the preliminary matcher 220 retrieves a plurality of listings that are either similar in spelling and/or at least sound the same as user's request, the preliminary matcher 220 may request the user to spell at least the first "N" letters of the request, where "N" could be any integer. The number of letters "N" could be a predetermined number and/or may be dynamically established by the database entry matcher 140. For example, if the user requests information for a listing in "Morristown, N.J.," the preliminary matcher 220 may retrieve "Morristown," Moorestown," and "Mauricetown" as candidates that may match the user's listing request. These candidates may be included in a short list that is sent to the refined matcher 230. In this case, the preliminary matcher 220 may automatically notify the output manager 130 that more than one listing matching the user's request has been found in the database 110.

The output manager 130 may initiate a dialogue with the output manager 130 to elicit additional information relating to the user's request from the user. For example, the output manager 130 may automatically request the user to spell the first N letters of the requested listing using the voice synthesizer. As indicated above, N may be a predetermined number or may be dynamically chosen by, for example, the refined matcher 230 and/or the output manager based on the retrieved listings included in the short list. For example, the refined matcher 230 may determine that a minimum number of three (3) (e.g., N=3) letters are needed to narrow the short list to a single listing that represents the user's request. This information (e.g., N=3) may be forwarded to the output manager 130, which initiates the appropriate dialogue with the user to elicit the requested information.

In this example, the user is asked to spell the first three (3) letters of the requested listing. This additional information is forwarded to the refined matcher 230, which uses this additional information to determine the requested listing. Additionally or optionally, the user may be asked to confirm the determined listing. If the listing is confirmed, the automated assistance system 100 completes, for example, the user's request for information.

In embodiments of the present invention, if a match for the listing is not found by either the preliminary matcher 220 and/or refined matcher 230, the database entry matcher may automatically search surrounding areas for the requested listing. Additionally and/or optionally, the output manager may prompt the user for more information that may be used to search for the listing request. This may be, for example, another address or another category for the listing request.

In embodiments of the present invention, an automated private branch exchange (PBX) (not shown) may be included in the system 100. The PBX may forward or connect the user's call to an operator or other individual if the requested information is not found. The PBX may assist the caller in completing the call if the user's requested listing is found and/or if another listing or call is desired by the user.

Figure 3:
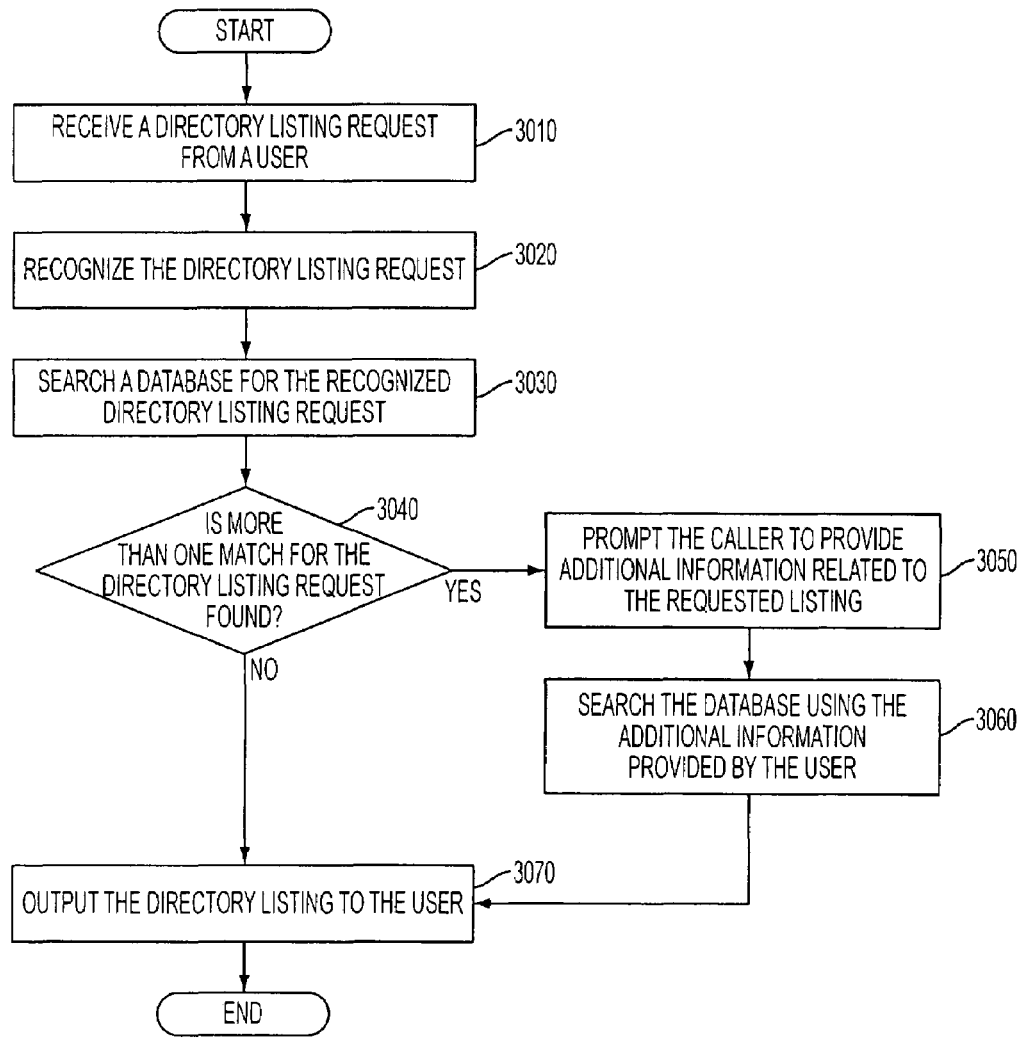
FIG. 3 is a flowchart showing a refined directory assistance method in accordance with an exemplary embodiment of the present invention.

FIG. 3 is a flowchart illustrating a method for providing automated directory assistance using an automated assistance system in accordance with an exemplary embodiment of the present invention. As shown in 3010, a directory listing request may be received from a user. The directory listing request is recognized by the system, as shown in 3020.

After the directory listing request is recognized, a first search of a database is conducted to find the recognized directory listing request, as shown in 3030. If a match for the recognized directory listing request is found with a confidence level that meets or exceeds a predetermined threshold, a directory listing is presented to the user, as shown in 3040 and 3070.

If more than one match for the recognized directory listing request is found in the database, the user is prompted to provide additional information that may be related to the listing, as shown in 3040–3050. For example, the additional information may be a street address, category information, alternative name and/or any other attribute or information related to the listing request. After the user is prompted for the additional information, a second search of the database is conducted using the additional information such as the street address, category information, etc. provided by the user, as shown in 3060. If a match based on the additional information is found, a directory listing is presented to the user, as shown in 3070.

If a match is not found, the user may be requested to repeat the request and/or input additional information. The system may conduct another search and process the request in accordance with embodiments of the present invention.

In embodiments of the present invention, a variety of techniques may be used to provide assistance to a user, to complete a request for information and/or otherwise process a user's call. For example, if more than one listing or match is found, any type of interactive dialogue may be employed by the system to provide a response, process the call, etc. The user may be requested to input the spelling of the entire or portion of the requested listing. A match may be found based on such input. It is recognized that one or more matched listings may be presented to the user and the user may be requested to select the desired listing. The user may be presented with the entire or a portion of the matched listings and the user may select the desired listing by appropriate input. Any technique may be used to process or complete the user's request for information.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for providing automated directory assistance using an automated assistance system, comprising:
   receiving a directory listing request from a user;
   recognizing the directory listing request;
   conducting a first search of a database for the recognized directory listing request;
   prompting the user to provide at least one of a street address and category information for the recognized directory listing request if more than one match for the recognized directory listing request is found in the database;
   conducting a second search of the database using at least one of the street address and the category information provided by the user in response to the prompting; and
   outputting a directory listing to the user if a match for the recognized directory listing request is found.

2. The method of claim 1, further comprising:
   forwarding the recognized directory listing request to an operator if no match for the recognized directory listing request is found during the second search.

3. The method of claim 1, further comprising:
   prompting the user to provide at least another one of a street address and category information for the recognized directory listing request if no match for the directory listing is found; and
   conducting a third search of the database using at least another one of the street address and category information for the recognized directory listing request.

4. The method of claim 3, further comprising:
   outputting the directory listing to the user if a match for the recognized directory listing request based on the third search is found.

5. The method of claim 1, wherein if a plurality of matches for the recognized directory listing request are found, presenting a list containing the plurality of matches to the user for selection.

6. The method of claim 1, wherein the category information is at least one of a restaurant, electronics store, grocery story, sporting goods store and department name.

7. The method of claim 1, further comprising:
   receiving an area name in which a business corresponding to the requested directory listing is located.

8. The method of claim 1, further comprising:
   prompting the user to spell at least a portion of the recognized directory listing request if more than one match for the recognized directory listing request are found in the database.

9. The method of claim 8, wherein a portion of the recognized directory listing request includes the first N-letters of the recognized listing request.

10. The method of claim 9, wherein N is first two to five letters of the recognized directory listing request.

11. The method of claim 9, wherein N is first five to letters of the recognized directory listing request.

12. The method of claim 9, wherein the first N-letters are automatically determined on the minimum number of letters required to distinguish the more than one match from one another.

13. Apparatus for providing automated directory assistance comprising:
   a recognizer that is to recognize a directory listing request received from a caller;
   a preliminary matcher that is to conduct a first search of a database for the recognized directory listing request;
   an output manager that is to prompt the user to provide at least one of a street address and category information for the recognized directory listing request; and
   a refined matcher that is to conduct a second search of the database using at least one of the street address and the category information provided by the user in response to the prompt by the output manager, wherein the output manager is to output a directory listing to the user if a match for the recognized directory listing request based on the second search is found.

14. The apparatus of claim 13, wherein the output manager to prompt the user if more than one match for the recognized directory listing request is found in the database by the preliminary matcher.

15. The apparatus of claim 13, wherein the output manager comprises:
   a speech recognizer.

16. The apparatus of claim 13, further comprising:
   a private branch exchange to connect a call to an operator if the match for the recognized listing is not found in the database.

17. The apparatus of claim 13, further comprising:
   a private branch exchange to connect a call based on the directory listing.

18. A machine-readable medium having stored thereon a plurality of executable instructions, the plurality of instructions comprising instructions to:
   receive a directory listing request from a user;
   recognize the directory listing request;
   conduct a first search of a database for the recognized directory listing request;
   prompt the user to provide at least one of a street address and category information for the recognized directory listing request if more than one match for the recognized directory listing request is found in the database;
   conduct a second search of the database using at least one of the street address and the category information provided by the user in response to the prompting; and
   output a directory listing to the user if a match for the recognized directory listing request is found.

19. The machine-readable medium of claim 18 having stored thereon additional executable instructions, the additional instructions comprising instructions to:

forward the recognized directory listing request to an operator if no match for the recognized directory listing request is found during the second search.

20. The machine-readable medium of claim 19 having stored thereon additional executable instructions, the additional instructions comprising instructions to:

prompt the user to provide at least another one of a street address and category information for the recognized directory listing request if no match for the directory listing is found; and conduct a third search of the database using at least another one of the street address and category information for the recognized directory listing request.

21. The machine-readable medium of claim 20 having stored thereon additional executable instructions, the additional instructions comprising instructions to:

output the directory listing to the user if a match for the recognized directory listing request based on the third search is found.

22. The machine-readable medium of claim 19 having stored thereon additional executable instructions, the additional instructions comprising instructions to:

receive an area name in which a business corresponding to the requested directory listing is located.

23. The machine-readable medium of claim 19 having stored thereon additional executable instructions, the additional instructions comprising instructions to:

prompt the user to spell at least a portion of the recognized directory listing request if more than one match for the recognized directory listing request are found in the database.

24. A method for providing automated directory assistance using an automated assistance system, comprising:

receiving a directory listing request from a user;

recognizing the directory listing request;

conducting a first search of a database for the recognized directory listing request;

prompting the user to provide additional information related to the recognized directory listing request if more than one match for the recognized directory listing request is found in the database;

conducting a second search of the database using the additional information provided by the user in response to the prompt; and outputting a directory listing to the user if a match for the recognized directory listing request is found.

25. The method of claim 24, further comprising:

forwarding the recognized directory listing request to an operator if no match for the recognized directory listing request is found during the second search.

26. The method of claim 24, further comprising:

prompting the user to provide a street address and category information for the recognized directory listing request if no match for the directory listing is found; and conducting a third search of the database using the street address and category information for the recognized directory listing request.

27. The method of claim 26, further comprising:

outputting the directory listing to the user if a match for the recognized directory listing request based on the third search is found.

28. The method of claim 24, wherein if a plurality of matches for the recognized directory listing request are found, presenting a list containing the plurality of matches to the user for selection.

29. The method of claim 24, wherein the additional information includes at least one of a street address, an alternate name and spelling of the requested listing.

30. The method of claim 24, wherein the additional information includes category information.

31. The method of claim 30, wherein the category information is at least one of a restaurant, grocery store, sporting goods store, jewelry store, book store, clothing store, theater, pizzerias, departments and street name.

32. Apparatus for providing automated directory assistance, comprising:

a recognizer that is to recognize a directory listing request;

a preliminary matcher that is to conduct a first search of a database for the recognized directory listing request;

an output manager that is to prompt the user to provide additional information related to the recognized directory listing request;

a refined matcher that is to conduct a second search of the database using the additional information provided by the user in response to the prompt;

wherein the output manager is to output a directory listing to the user if a match for the recognized directory listing request is found.

33. The apparatus of claim 32, wherein the output manager comprises:

a speech synthesizer.

34. The apparatus of claim 32, wherein the output manager to prompt the user if more than one match for the recognized directory listing request is found in the database.

35. The apparatus of claim 32, wherein the additional information includes at least one of a street address, an alternate name and spelling of the requested listing.

36. The apparatus of claim 32, wherein the additional information includes category information.

37. The apparatus of claim 36, wherein the category information is at least one of a restaurant, grocery store, sporting goods store, jewelry store, book store, clothing store, theater, pizzerias, departments and street name.

* * * * *